(No Model.)
G. W. KING.
REVERSING GEAR.
No. 520,647. Patented May 29, 1894.
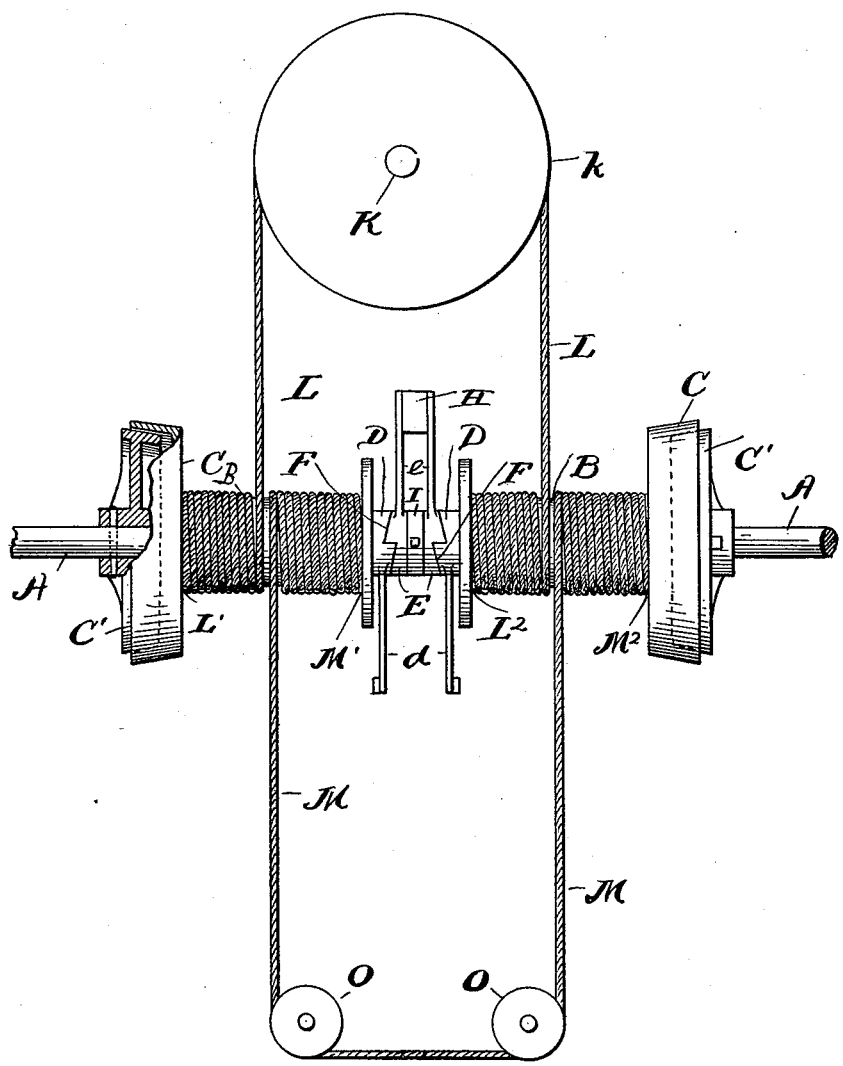

UNITED STATES PATENT OFFICE.

GEORGE W. KING, OF MARION, OHIO.

REVERSING-GEAR.

SPECIFICATION forming part of Letters Patent No. 520,647, dated May 29, 1894.

Application filed December 26, 1893. Serial No. 494,713. (No model.)

*To all whom it may concern:*

Be it known that I, GEORGE W. KING, of Marion, in the county of Marion and State of Ohio, have invented certain new and useful Improvements in Reversing-Gears; and I do hereby declare the following to be a full, clear, and exact description of the invention, such as will enable others skilled in the art to which it pertains to make and use the same.

My invention relates to improvements in reversing gears whereby motion is capable of being communicated from a shaft rotating continuously in one direction to the reversible member; and the invention consists in certain features of construction and in combinations of parts hereinafter described and pointed out in the claim.

The accompanying drawing exhibits a plan of a reversing gear embodying my invention, portions being broken away and in section to more clearly show the construction.

Referring to the drawing, A designates a horizontal shaft adapted to rotate continuously in one direction. Two drums B B are shown loosely mounted upon said shaft at suitable intervals apart. Said drums, at their outer end, carry, respectively, the one member C of a clutch, the other members C' C' of the clutches being operatively mounted upon the shaft in any suitable manner. I prefer the employment of friction-clutches and members C of said clutches, that, as already indicated, are rigid or operatively connected with drums B and are normally out of operative connection with the shaft, constitute the female members of the clutches, whereas members C', that are fixed on the shaft, constitute the male members of the clutches. Upon shaft A, at the inner end of each drum B, are loosely mounted two collars, D and E, respectively, the inner collars E being held stationary, each having, a laterally-extending arm e, that is attached to any stationary object or member, H. Collars E are each held, from moving endwise on the supporting-shaft, in the direction away from the contiguous collar D, by means of a collar I mounted rigidly on the shaft between the two collars E. The opposing ends or surfaces of the contiguous collars D E are provided, respectively, with one or more inclines, F, the arrangement and trend whereof are such that the adjacent clutch-member-bearing-drum, by turning collar E' in the one direction, shall be actuated to bring the clutch-member carried thereby into frictional engagement with the companion clutch-member and thereby establish operative connection between said drum and the shaft, and, when the members of the clutch are in operative connection with each other, by turning collar E in the opposite direction the drum is released or loosened.

K designates a vertical shaft to which motion is to be communicated, and which shaft K is to be rotated alternately in opposite directions. A sheave or pulley k is shown operatively mounted upon shaft K, and a rope, chain or cable L leads to and over said sheave from the drums and has its ends attached to the drums, the one end of the cable, chain or rope being attached to the outer end of the one drum at L', and the other end of the rope, chain or cable being attached to the inner end of the other drum, at L². It will, therefore, be observed that as either one of the drums is operatively connected with shaft A the cable, chain or rope is wound upon one of the drums and paid out by the other drum, and that the reversible shaft or member K is rotated in the one direction or the other according as the one or the other of the drums is operatively connected with shaft A.

Of course, it is manifest that, by the reversing gear hereinbefore described, the reversible shaft or member can be rotated but a limited interval of time in one direction, said interval of time being governed by the length of actuating-rope or cable and capacity of the drums. In many machines, however, such for instance, as swinging booms or cranes, the reversing gear hereinbefore described will be found very convenient and desirable.

Collars D have, respectively, a laterally-extending arm d for the attachment of lever mechanism (not shown) for operating the collar.

Suitable means are provided for keeping rope, chain or cable L always stretched and for preventing one drum from paying out more cable, chain or rope than the other drum is capable of taking up. Preferable means for the purpose consists of a rope, chain or cable, M, that is fastened, at the ends, to the different drums, respectively, and leads from the drums to and over one or more sheaves or pulleys, O, cable, chain or rope M being attached, at one end, as at M', to the inner end of the drum that has rope or cable L attached to its outer end, and being attached, at its other end, as at M², to the outer end of the drum that has rope or cable L attached to its inner end. Hence, it will be observed that when rope or cable M is wound upon one of the drums it is paid out by the other drum and that it is wound upon the drum that pays out rope or cable L, whereby the latter is always kept tightly stretched and either of the drums is prevented from, paying out more rope or cable L than the other drum is capable of taking up.—

What I claim is—

The combination with a shaft adapted to rotate continuously in one direction, a reversible shaft, two drums loosely mounted upon one of said shafts, a clutch for each of said drums, one member of each clutch being rigid or operatively connected with the drum and the companion clutch-member being rigid or operatively connected with the shaft, suitable means for establishing operative connection between the two clutch-members, of a rope or cable engaging the drums on the one shaft and operatively connecting with the other shaft, the arrangement of parts being such that the reversible shaft shall be actuated in the one direction or the other according as the one or the other of the aforesaid drums is operatively connected with the supporting-shaft, and another rope or cable M having its two ends fastened to the different drums, respectively, and arranged substantially as and for the purpose set forth.

In testimony whereof I sign this specification, in the presence of two witnesses, this 1st day of November, 1893.

GEORGE W. KING.

Witnesses:
C. H. DORER,
ROLLA C. PERRY.